United States Patent
Carpenter

(12) 
(10) Patent No.: US 6,175,798 B1
(45) Date of Patent: Jan. 16, 2001

(54) ALGORITHM FOR VERIFICATION OF CORRECT ABS CONTROLLER INSTALLATION

(75) Inventor: Scott E. Carpenter, Westland, MI (US)

(73) Assignee: Kelsey-Hayes Company, Livonia, MI (US)

(*) Notice: Under 35 U.S.C. 154(b), the term of this patent shall be extended for 0 days.

(21) Appl. No.: 09/453,673

(22) Filed: Dec. 3, 1999

Related U.S. Application Data

(60) Provisional application No. 60/048,859, filed on Jun. 6, 1997.

(51) Int. Cl.[7] .................................................. B60T 8/32
(52) U.S. Cl. ............................ 701/76; 701/71; 701/77
(58) Field of Search ............................ 701/71, 76, 77; 303/140, 146, 122

(56) References Cited

U.S. PATENT DOCUMENTS

| | | | |
|---|---|---|---|
| 5,138,556 | * 8/1992 | Yoshino | 701/76 |
| 5,277,482 | * 1/1994 | Beyer et al. | 303/122.06 |
| 5,490,072 | * 2/1996 | Hornback | 701/76 |
| 5,492,396 | * 2/1996 | Weber | 303/149 |
| 5,493,495 | * 2/1996 | Naito et al. | 701/76 |
| 5,612,880 | 3/1997 | Kojima et al. | 701/75 |
| 5,941,612 | * 8/1999 | Carpenter | 303/122 |

* cited by examiner

Primary Examiner—William A Cuchlinski, Jr.
Assistant Examiner—Marthe Marc-Coleman
(74) Attorney, Agent, or Firm—MacMillan, Sobanski & Todd, LLC

(57) ABSTRACT

An algorithm for an anti-lock brake system controller monitors the voltage appearing at a status port to determine whether the controller has been installed the correct vehicle. The algorithm is responsive to detection that the controller has been installed in an incorrect vehicle to disable the anti-lock brake system.

17 Claims, 4 Drawing Sheets

ALGORITHM FOR VERIFICATION OF CORRECT ABS CONTROLLER INSTALLATION

CROSS REFERENCE TO RELATED APPLICATIONS

This application claims the benefit of U.S. Provisional Application No. 60/048,859, filed Jun. 6, 1997.

BACKGROUND OF THE INVENTION

This invention relates in general to anti-lock brake systems and in particular an algorithm for verification that the anti-lock brake system control module installed in a particular vehicle corresponds to the configuration of the vehicle drive train.

An Anti-lock Brake System (ABS) is often included as standard or optional equipment on new vehicles. When actuated, the ABS is operative to control the operation of some or all of the vehicle wheel brakes. A typical ABS includes a plurality of solenoid valves mounted within a control valve and connected to the vehicle hydraulic brake system. Usually, a separate hydraulic source, such as a motor driven pump, is included in the ABS for reapplying hydraulic pressure to the controlled wheel brakes during an ABS braking cycle. An ABS further includes an electronic control module which is electrically connected to wheel speed sensors mounted adjacent to the controlled wheels, the solenoid valves and pump motor. The control module can be mounted directly upon the control valve or located remotely therefrom. The control module includes a microprocessor, or ABS controller, which is programmed to control the ABS in accordance with a control algorithm and parameters permanently stored in a Read Only Memory (ROM). The microprocessor also can access a Random Access Memory (RAM) for temporary storage and retrieval of data.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is responsive thereto to close a power relay. The power relay controls the supply of electric power to enable the solenoid valves and actuate the pump motor. The microprocessor selectively actuates the solenoid valves in the control valve in accordance with the control algorithm stored in the ROM to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to is produce adequate brake torque to decelerate the vehicle.

SUMMARY OF THE INVENTION

This invention relates to an algorithm for verification that the anti-lock brake system control module installed in a particular vehicle corresponds to the configuration of the vehicle drive train.

The majority of four wheeled vehicles have either the two front or two rear wheels powered. Such two wheel drive (2WD) vehicles are commonly referred to as having a 4×2 drive train. The ABS control module associated with a 4×2 vehicle drive train includes a 4×2 algorithm which provides optimal braking during an ABS brake cycle. However, inclusion of drive trains for powering all four wheels in vehicles has become increasingly popular. Such four wheel drive (4WD) vehicles, which are commonly referred to as having a 4×4 drive train, normally operate in a two wheel drive mode and include a transfer case which, upon selection by the vehicle operator, couples the normally nondriven wheels to the vehicle engine. When all four vehicle wheels are driven, a different ABS brake response is required to assure optimal braking during an ABS brake cycle. Accordingly, the ABS control module installed in a vehicle having four wheel drive has a 4×4 control algorithm which provides a brake response corresponding to the operational mode of the vehicle.

In order to minimize manufacturing and inventory costs while providing uniform installation connections, the same hardware is utilized for both 4×2 and 4×4 vehicles. Specific software which includes an ABS control algorithm customized for the particular vehicle drive train is loaded into the ABS control module. It would be desirable to verify that the installed software corresponds to the vehicle drive train. Additionally, it would be desirable to prevent operation of a mismatched ABS control algorithm if the control module has been incorrectly installed, as could happen if the module has been obtained from a used parts dealer.

The present invention contemplates a controller for an anti-lock brake system which includes a microprocessor adapted to operate the anti-lock brake system. The microprocessor includes a status port adapted to be connected to a four wheel drive transfer case. The controller also includes a verification algorithm for the microprocessor with the algorithm being responsive to a condition at the status port to prevent said microprocessor from operating the anti-lock brake system. The algorithm is further responsive to the condition to cause the microprocessor to generate an alarm signal.

The algorithm can be responsive to the status port being connected to ground or to a constant voltage being applied thereto to prevent the microprocessor from operating the anti-lock brake system. The algorithm also can be responsive to a varying status signal being applied to said status port to prevent said microprocessor from operating the anti-lock brake system. In the preferred embodiment, the algorithm is responsive to the frequency of the status signal being outside of a predetermined frequency range to prevent the microprocessor from operating the anti-lock brake system.

Alternately, the controller status port can be adapted to be connected to a source of a predetermined voltage or to ground. In the former case, upon detection of a zero voltage or a variable voltage having a frequency, the algorithm is operative to prevent the microprocessor from operating the anti-lock brake system. In the later case, upon detection of a non-zero voltage or a variable voltage having a frequency, the algorithm is operative to prevent the microprocessor from operating the anti-lock brake system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention is directed to an algorithm for verifying that the ABS controller is installed in a vehicle having a drive train which corresponds to the controller software. In the preferred embodiment, the algorithm is included as a subroutine in the ABS control algorithm.

Figure 1:
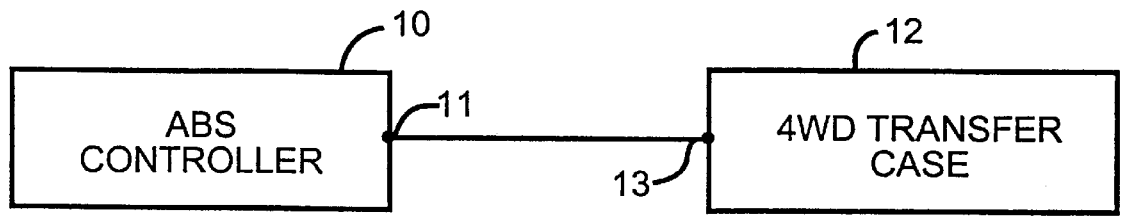
FIG. 1 is a schematic diagram illustrating the installation of an ABS controller in a four wheel drive vehicle.

Referring now to the drawings, there is illustrated in FIG. 1 schematic diagrams for an ABS controller 10 which is installed in a 4×4 vehicle. The ABS controller 10 includes a "4×4" port 11. The 4×4 port 11 receives an input signal from a transfer case 12 which is included in a four wheel drive vehicle. As shown in FIG. 1, the transfer case 12 includes a status port 13 which is connected to the 4×4 port 12 of the ABS controller 10.

The transfer case 12 generates a status signal at the status signal port 13. In the preferred embodiment, the status signal consists of a pulse train which alternates between ground and a fixed positive voltage, such as five volts. The frequency of the status signal is indicative of the whether the transfer case is in the 4×2 or 4×4 operating mode. In the preferred embodiment, an eight Hertz status signal is generated at the status port 13 when the transfer case 12 is in the 4×2 mode and a four Hertz status signal is generated when the transfer case 12 is in the 4×4 mode.

Because the transfer case status port 13 is electrically connected to the 4×4 port 11 on the ABS controller 10, as shown in FIG. 1, the ABS controller 10 is continuously receiving either a four or an eight Hertz signal at the 4×4 port 11. The control algorithm in the ABS controller 10 is responsive to the frequency of the transfer case status signal to provide an appropriate ABS brake cycle response.

Figure 2:
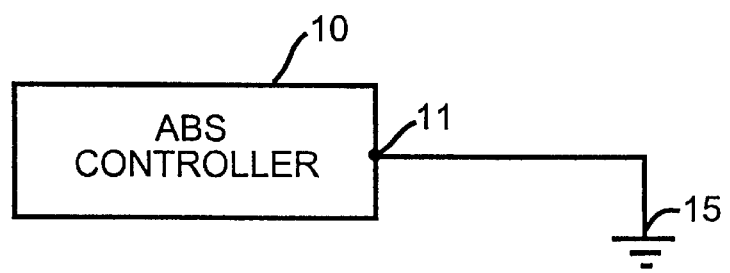
FIG. 2 is a schematic diagram illustrating the installation of an ABS controller in a two wheel drive vehicle.
Figure 3:
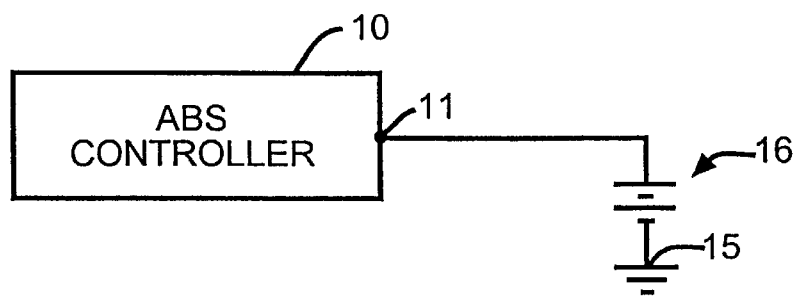
FIG. 3 is a schematic diagram illustrating an alternate installation of an ABS controller in a two wheel drive vehicle.

As described above, the same ABS hardware is installed in two wheel and four wheel drive vehicles. Either a 4×2 or 4×4 control algorithm, which corresponds to the particular vehicle drive train, is loaded into the ABS controller 10. The connection of the controller 4×4 port 11 for a 4×2 vehicle is illustrated in FIGS. 2 and 3. A 4×2 vehicle does not have a transfer case, and the 4×4 port 11 can be held "LOW" by electrically connecting the 4×4 port 11 a vehicle ground 15, as shown in FIG. 2. Alternately, the 4×4 port 11 can be held "HIGH" by electrically connecting the port 11 to a fixed voltage supply 16, as shown in FIG. 3. The fixed voltage supply 16 is an available voltage source, such as, for example, a regulated five volts supplied by the ABS controller 10 or a nominal 12 volts supplied by the vehicle power supply.

Figure 4:
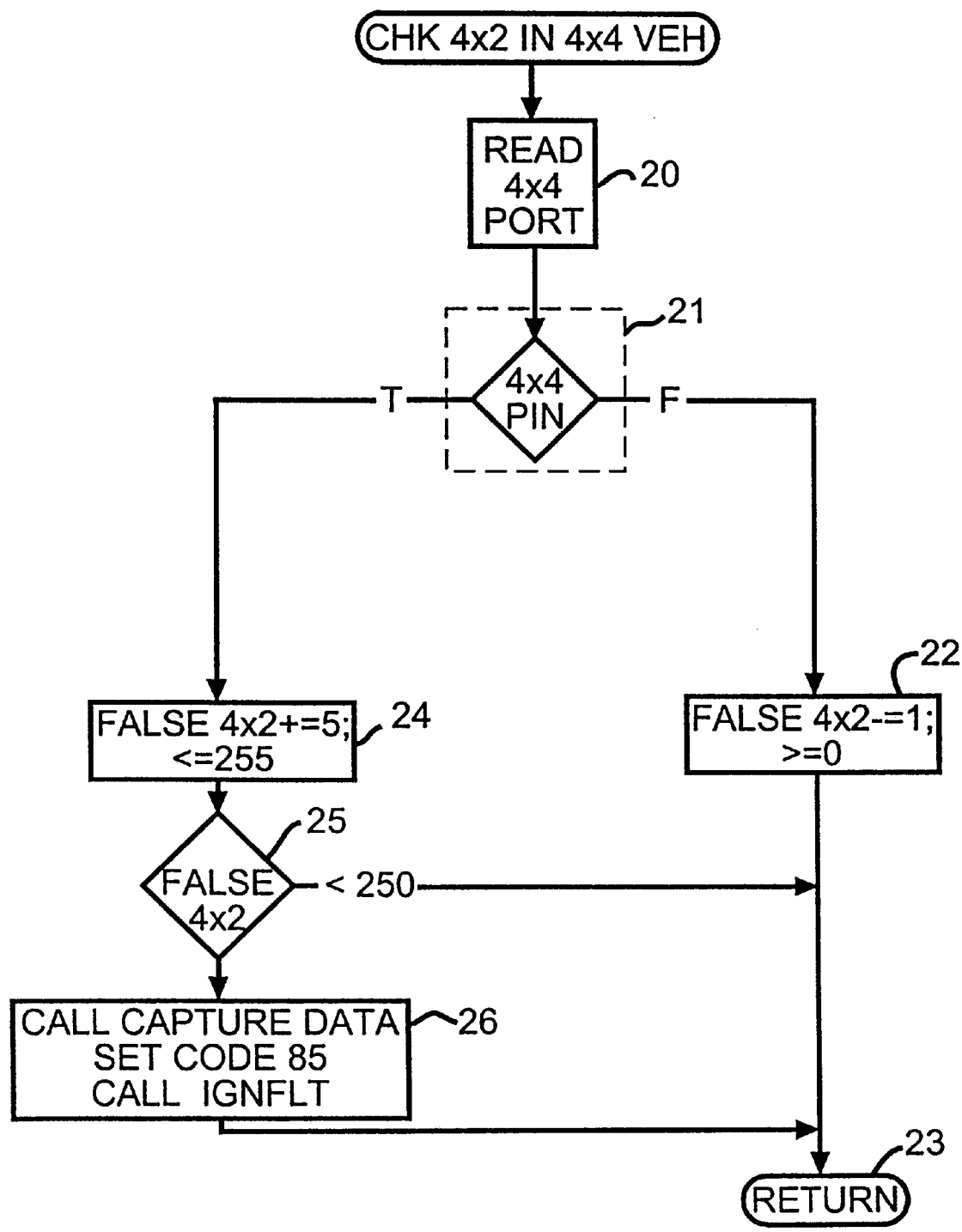
FIG. 4 is a flow chart for an algorithm in accordance with the invention which detects that an ABS controller for a two wheel drive vehicle is installed in a four wheel drive vehicle or improperly installed in a two wheel vehicle.

The present invention contemplates an installation verification algorithm which is responsive to the voltage or signal present at the ABS controller 4×4 port 11 to determine whether the controller 10 has been installed in the correct vehicle. Additionally, for a 4×4 vehicle, the algorithm can detect a malfunction of the transfer case 12. Referring now to FIG. 4, there is shown a flow chart for an installation verification algorithm which would be included as a subroutine in a control algorithm for a 4×2 vehicle having the ABS controller 4×4 port 11 grounded, as shown in FIG. 2. The algorithm is called during each iteration of the control algorithm.

In functional block 20, the 4×4 port 11 is read. If there is no voltage at the 4×4 port 11, a zero is placed in a temporary storage register. If there is a voltage at the port 11, a one is placed in the same temporary storage register. The alogrithm then continues to a first decision block 21. In the first decision block 21, the content of the temporary storage register is compared to zero with an IF . . . THEN logic statement.

If the temporary storage register contains a zero, which corresponds to the 4×4 port 11 being grounded, as shown in FIG. 2, the result of the comparison in the first decision block 21 is "FALSE". Accordingly, the algorithm follows a "FALSE path", which is the right branch in FIG. 4, and transfers to functional block 22 where a counter labeled "FALSE 4×2" is decremented by one. The algorithm then returns to the main control algorithm through RETURN block 23. For each iteration that the algorithm follows the FALSE path to functional block 22, the counter FALSE 4×2 is decremented until the counter reaches zero.

If the temporary storage register contains a one, which corresponds to a voltage being present at the 4×4 port 11, the result of the comparison in the first decision block 21 is "TRUE". Accordingly, the algorithm follows a "TRUE path", which is to the left in FIG. 4, and transfers to functional block 24 where the counter FALSE 4×2 is incremented by five. For each iteration that the algorithm follows the TRUE path to functional block 24, the counter FALSE 4×2 is incremented until the counter reaches a maximum of 255, which corresponds to 51 iterations.

After incrementing the FALSE 4×2 counter, the algorithm continues to a second decision block 25. In the second decision block 25, the counter FALSE 4×2 is compared to a threshold value, which in the preferred embodiment is 250. If the counter is less than the threshold value, the algorithm returns to the main control algorithm through RETURN block 23.

If the counter FALSE 4×2 is equal to or exceeds the threshold value in the second decision block 25, the algorithm transfers from decision block 25 to functional block 26 where an error code is set and an ignition fault IGNFLT subroutine is called. The IGNFLT subroutine disables the ABS controller 10 so that the ABS is inoperative. The IGNFLT subroutine also illuminates a warning lamp (not shown) to alert the vehicle operator of a malfunction. The control module communications continue to function to allow diagnosis of the problem.

The operation of the installation verification algorithm will now be explained. If the ABS controller 10 is correctly installed in 4×2 vehicle with the 4×4 port connected to ground, zero voltage will appear at the 4×4 port 11. Each time the vehicle ignition is turned on, the ABS controller 10 will be activated in a monitoring mode. During each iteration of the control algorithm, the installation verification algorithm will be called. The verification algorithm will read the zero voltage at the 4×4 port 11 and a zero will be loaded into the temporary storage register. Accordingly, the first decision block 21 will produce a FALSE indication and the algorithm will follow the FALSE path to decrement the FALSE 4×2 counter by one. Following the iteration of the installation verification algorithm, the operation of the ABS controller 10 is returned to the control algorithm.

If the ABS controller 10 is installed in 4×2 vehicle, but the 4×4 port is incorrectly connected to voltage supply, a voltage will appear at the 4×4 port 11. The verification algorithm will read the voltage at the 4×4 port 11 and a one will be loaded into the temporary storage register. Accordingly, the first decision block 21 will produce a TRUE indication and the algorithm will follow the TRUE path to increment the FALSE 4×2 counter by five. Following the iteration of the installation verification algorithm, the operation of the ABS controller 10 is returned to the control algorithm; however, upon each successive iteration of the control algorithm, the FALSE 4×2 counter will again be incremented by five. Upon the FALSE 4×2 counter being equal to, or exceeding, 250, which corresponds to 50 iterations of the algorithm, the second decision block 25 will cause the algorithm to transfer to functional block 26 and the ABS controller 10 will be disabled.

If the controller 10 is incorrectly installed in a 4×4 vehicle, the 4×4 port 11 will be connected to the status signal port 15 of the vehicle transfer case 14. As described above, the voltage at the 4×4 port 11 will alternate between ground and a positive voltage. Accordingly, over a period of time, the installation verification algorithm will read a FALSE zero voltage for approximately half of the iterations and a TRUE positive voltage during approximately half of the iterations. As discussed above, the FALSE path to the right in FIG. 2 is followed when a FALSE voltage is read, which results in the FALSE 4×2 counter being decremented by one. Alternately, the TRUE path to the left in FIG. 2 is followed when a TRUE voltage is read, which results in the FALSE 4×2 counter being incremented by five. Because the FALSE 4×2 counter is incremented by a larger amount than it is decremented, after a number of iterations, the FALSE 4×2 counter will exceed the threshold and the controller 10 will be disabled.

The present invention contemplates that a special test tool would be included at the end of the vehicle assembly line to exercise the ABS controller 10 to verify with the algorithm that the controller 10 is properly installed. Because at least 51 iterations are required to disable the ABS controller 10, a random false reading at the 4×4 port will not cause a corresponding false disablement of the controller 10.

Figure 5:
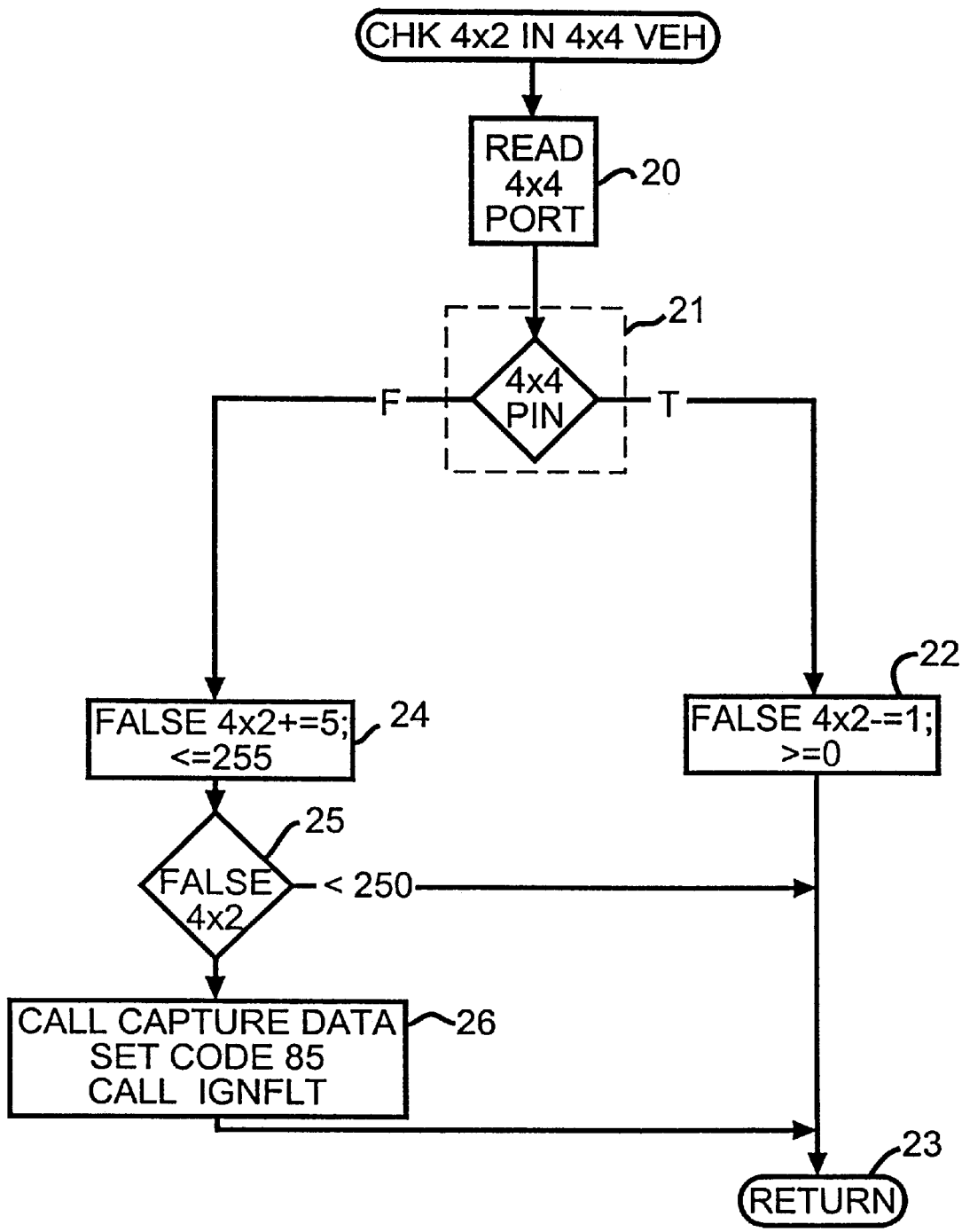
FIG. 5 is a flow chart for an alternate embodiment of the algorithm illustrated in FIG. 4.

A flow chart for an alternate embodiment of the installation verification algorithm is shown in FIG. 5. The alternate embodiment of the algorithm is included as a subroutine in a control algorithm for a 4×2 vehicle having the ABS controller 4×4 port held high, as shown in FIG. 3. The algorithm is called during each iteration of the control algorithm. The logic blocks of the flow chart in FIG. 5 are identical to corresponding logic blocks in the flow chart shown in FIG. 4 and accordingly have the same numerical designators.

In the alternate embodiment, the branches of the algorithm extending from the first decision block 21 have been reversed from the directions shown for the corresponding branches in FIG. 4. Accordingly, when a voltage is detected at the 4×4 port 11, the TRUE path leads to functional block 22 where the FALSE 4×2 counter is decremented by one. Alternately, when no voltage is detected at the 4×4 port 11, the FALSE path leads to functional block 24 where the FALSE 4×2 counter is incremented by five. Thus, as was discussed above, a continuous voltage at the 4×4 port 11 will simply incrementally decrease the FALSE 4×2 counter to zero. Alternately, zero voltage readings, which would correspond to the configurations shown in FIGS. 1 and 2, would cause the FALSE 4×2 counter to be incrementally increased to a maximum of 255 and the controller 10 disabled.

Figure 6:
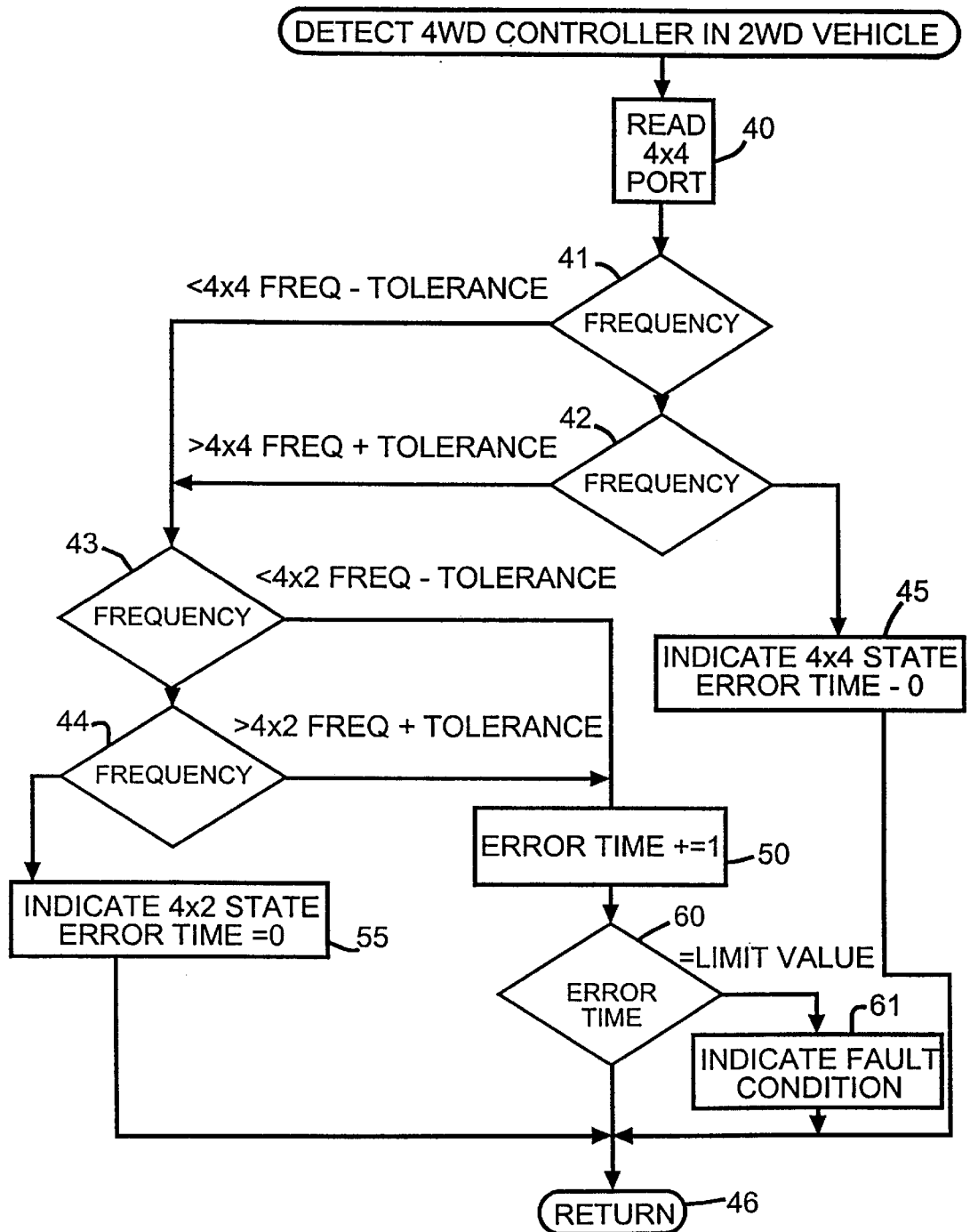
FIG. 6 is a flow chart for an algorithm in accordance with the invention which detects that an ABS controller for a four wheel drive vehicle is malfunctioning or improperly installed in a two wheel drive vehicle.

Referring now to FIG. 6, there is shown a flow chart for an installation verification algorithm which would be included as a subroutine in an ABS control algorithm for a 4×4 vehicle having the ABS controller 4×4 port electrically connected to a 4WD transfer case 14, as shown in FIG. 1. As described above, a transfer case status signal having one of two frequencies is generated by the transfer case 14 and applied to the 4×4 port 11 of the ABS controller 10. While the transfer case status signal in the preferred embodiment has a nominal frequency of either four or eight Hz, the signal frequency can vary slightly from these values. In the preferred embodiment, the ABS controller 10 is responsive to a status signal within a range of 3.6 Hz to 4.4 Hz to operate in a 4WD mode and the controller 10 is responsive to a status signal within a range of 7.2 Hz to 8.8 Hz to operate in a 2WD mode The installation verification subroutine is called during each iteration of the ABS control algorithm. The verification subroutine checks the frequency of the transfer case status signal present at the 4×4 port 11 on the ABS controller 10. As long as the frequency of the transfer case status signal remains within the predetermined acceptable ranges described above, normal operations occur. However, if the frequency of the transfer case status signal drifts out of the acceptable ranges and remains outside for longer than a predetermined time period, the algorithm will disable the ABS controller 10. Furthermore, if a constant voltage, or no voltage, appears at the 4×4 port 11, which would occur if the controller 10 is installed in a 4×2 vehicle as illustrated in FIGS. 2 and 3, the algorithm also will disable the controller 10.

When the installation verification algorithm is called by the ABS control algorithm, the frequency of the transfer case status signal is read in functional block 40. The frequency of the transfer case status signal is compared to the 4WD frequency range in a first pair of decision blocks 41 and 42. In the first decision block 41, the frequency is compared to the lower limit for the 4WD frequency range, which is 3.6 Hz in the preferred embodiment. If the frequency is less than 3.6 Hz, the algorithm transfers to a second pair of decision blocks, 43 and 44, where, as will be described below, the frequency of the signal is compared to the 2WD drive frequency range.

If, in decision block 41, the signal frequency is equal to or greater than 3.6 Hz, the algorithm transfers to the second decision block 42 where the frequency is compared to the upper limit for the 4WD frequency range, which is 4.4 Hz in the preferred embodiment. If the frequency is greater than 4.4 Hz, the algorithm transfers to the second pair of decision blocks, 43 and 44. If the signal frequency is equal to, or less than, 4.4 Hz, the frequency is within the 4WD frequency range and the algorithm transfers to functional block 45.

In functional block 45, a STATE flag is set to indicate that the transfer case is in the 4×4 mode and an ERROR TIME counter is cleared. The STATE flag is utilized by the ABS control algorithm to provide the corresponding response during an anti-lock brake cycle. The algorithm then returns to the ABS control algorithm through RETURN block 46.

As indicated above, if the frequency of the transfer case status signal is outside of the 4WD frequency range, the algorithm transfers to a third decision block 43 where the signal frequency is compared to the lower limit for the 2WD frequency range, which is 7.2 Hz in the preferred embodiment. If the frequency is less than 7.2 Hz, the algorithm transfers to an error subroutine which begins with functional block 50. The error subroutine will be described below.

If, in decision block 41, the signal frequency is equal to or greater than 7.2 Hz, the algorithm transfers to a fourth decision block 44 where the frequency is compared to the upper limit for the 2WD frequency range, which is 8.8 Hz in the preferred embodiment. If the frequency is greater than 8.8 Hz, the algorithm transfers to the functional block 50 to start the error subroutine. If the signal frequency is equal to, or less than, 8.8 Hz, the frequency is within the 2WD frequency range and the algorithm transfers to functional block 55.

In functional block 55, a STATE flag is set opposite from the setting utilized in functional block 45 to indicate that the transfer case is in the 4×2 mode and the ERROR TIME counter is cleared. For example, if a zero for the STATE flag indicates that the transfer case is in the 4×4 operating mode, then a one for the STATE flag indicates that the transfer case is in the 4×2 operating mode. Alternately, if a one for the STATE flag indicates that the transfer case is in the 4×4 operating mode, then a zero for the STATE flag indicates that the transfer case is in the 4×2 operating mode. The algorithm then returns to the ABS control algorithm through RETURN block 46.

As indicated above, if the frequency of the transfer case status signal is outside both the 4WD and 2WD frequency ranges, the algorithm transfers to functional block 50 where the "ERROR TIME" counter is incremented by one. The algorithm then proceeds to an ERROR TIME decision block 60 where the ERROR TIME counter is compared to a predetermined ERROR TIME threshold value which corresponds to a preselected time period. If the ERROR TIME counter is less than the ERROR TIME threshold, the algorithm transfers through RETURN block 46 to the ABS control algorithm.

If the ERROR TIME counter equals the ERROR TIME threshold value, the algorithm transfers to functional block 61 to indicate a fault condition. In the preferred embodiment an error code is set and the ignition fault IGNFLT subroutine is called in functional block 61. As described above, the IGNFLT subroutine disables the ABS controller 10 so that the ABS is inoperative. Additionally, the IGNFLT subroutine illuminates a warning lamp to alert the vehicle operator of a malfunction. The control module communications continue to function to allow diagnosis of the problem.

The operation of the algorithm will now be described. After the frequency of the transfer case status signal is read, the frequency is compared to the 4WD frequency range. If the frequency is within the 4WD frequency range, the 4×4 STATE flag is set and the ERROR TIME counter is cleared. The algorithm then returns to the ABS control algorithm.

If the frequency of the transfer case status signal is outside of the 4WD frequency range, the frequency is compared to the 2WD frequency range. If the frequency is within the 2WD frequency range, the 4×2 STATE flag is set and the ERROR TIME counter cleared. The algorithm then returns to the ABS control algorithm.

If the status signal frequency is outside of both the 4WD and 2WD frequency ranges, the ERROR TIME counter is incremented by one and the algorithm returns to the ABS control algorithm. If the status signal remains outside of the 4WD and 2WD frequency ranges during subsequent iterations, the ERROR TIME counter continues to be incremented until the ERROR TIME threshold is reached, at which time the ABS controller 10 is disabled. Thus, the algorithm detects a malfunction of the transfer case 14 during operation of a 4×4 vehicle.

Additionally, the algorithm will detect an incorrect installation in a 4×2 vehicle. As explained above, when the controller 10 is installed in a 4×2 vehicle, the 4×4 port 11 is connected to either ground or a fixed voltage. Either condition will result in a non-alternating, or zero frequency, signal at the 4×4 port 11. The algorithm will recognize a zero frequency signal as being outside of the 4WD and 2WD frequency ranges and will increment the ERROR TIME counter during each iteration. Upon the ERROR TIME counter value reaching the ERROR TIME threshold, the algorithm will transfer to functional block 61 and disable the controller 10. As with the 4×2 algorithms described above, a random false signal will not cause the algorithm to disable the controller 10 since the ERROR TIME threshold would not be reached.

As described above, a special test tool would be included at the end of the vehicle assembly line to exercise the ABS controller 10 and verify with the algorithm that the controller 10 is properly installed.

Additionally, the verification algorithms preclude operation of the ABS controller 10 if the unit is later transferred to another vehicle which does not have a drive train which corresponds to the control algorithm. Such a situation could occur if the controller were removed from a vehicle in a used auto parts lot and then resold on the open market.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described for an ABS, it will be appreciated that the invention can be practiced with other systems, such as, for example, traction control and vehicle stability systems.

What is claimed is:

1. A controller for an anti-lock brake system, the controller comprising:

a microprocessor adapted to operate the anti-lock brake system, said microprocessor including a status port adapted to be connected to a four wheel drive transfer case; and a verification algorithm for said microprocessor, said algorithm being responsive to a condition at said status port to cause said microprocessor to disable the anti-lock brake system.

2. The controller according to claim 1 wherein said algorithm indexes a counter by a predetermined amount upon each successive occurrence of said condition at said status port and further wherein said algorithm is responsive to prevent said microprocessor from operating the anti-lock brake system when the total count of said occurrences exceeds a predetermined threshold.

3. The controller according to claim 2 wherein said algorithm is further responsive to said condition at said status port to cause said microprocessor to generate an alarm signal.

4. The controller according to claim 2 wherein said counter is indexed when a constant non-zero voltage is applied to said status port.

5. The controller according to claim 2 wherein said counter is indexed when said status port voltage is zero.

6. The controller according to claim 2 wherein said counter is indexed when a time varying status signal is applied to said status port.

7. The controller according to claim 6 wherein said status signal has a frequency and said counter is indexed when said status signal frequency is outside of a predetermined frequency range.

8. The controller according to claim 7 wherein said counter is reset when said status signal frequency is within said predetermined frequency range.

9. The controller according to claim 6 wherein said status signal has a frequency and said counter is indexed when said status signal frequency is outside of one of a plurality of predetermined frequency ranges.

10. The controller according to claim 9 wherein said counter is reset when said status signal includes a frequency which is within one of said frequency ranges.

11. A controller for an anti-lock brake system, the controller comprising:
   a microprocessor adapted to operate the anti-lock brake system, said microprocessor including a status port adapted to be connected to a source of a predetermined voltage; and
   a verification algorithm for said microprocessor, said algorithm being responsive to a condition at said status port to cause said microprocessor to disable the anti-lock brake system.

12. The controller according to claim 11 wherein said algorithm indexes a counter by a predetermined amount upon each successive occurrence of said condition at said status port and further wherein said algorithm is responsive to prevent said microprocessor from operating the anti-lock brake system upon the total count of said occurrences exceeds a predetermined threshold.

13. The controller according to claim 12 wherein said counter is decremented by a predetermined amount upon a non-occurrence of said condition.

14. The controller according to claim 13 wherein said algorithm is further responsive to said condition at said status port to cause said microprocessor to generate an alarm signal.

15. The controller according is claim 13 wherein said predetermined status port voltage is zero and said counter is indexed when there is a non-zero voltage at said status port.

16. The controller according to claim 15 wherein said non-zero voltage has a predetermined frequency.

17. The controller according to claim 13 wherein said predetermined status port voltage is a non-zero voltage and said counter is indexed when there is a zero voltage at said status port.

* * * * *